Dec. 8, 1931.  F. J. YOCHEM  1,835,196
SPREADER OR DISTRIBUTOR
Filed Feb. 11, 1931  4 Sheets-Sheet 4

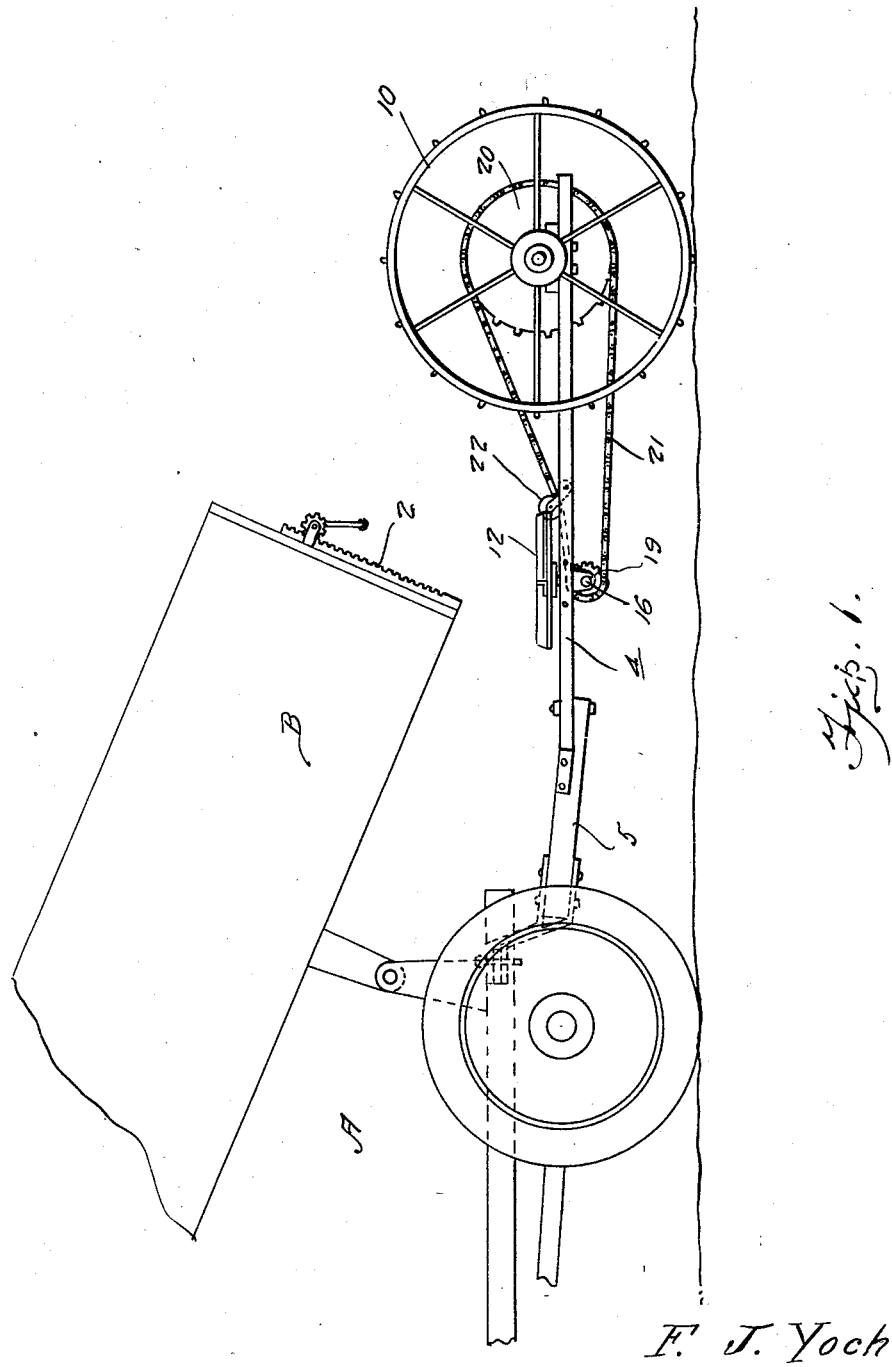

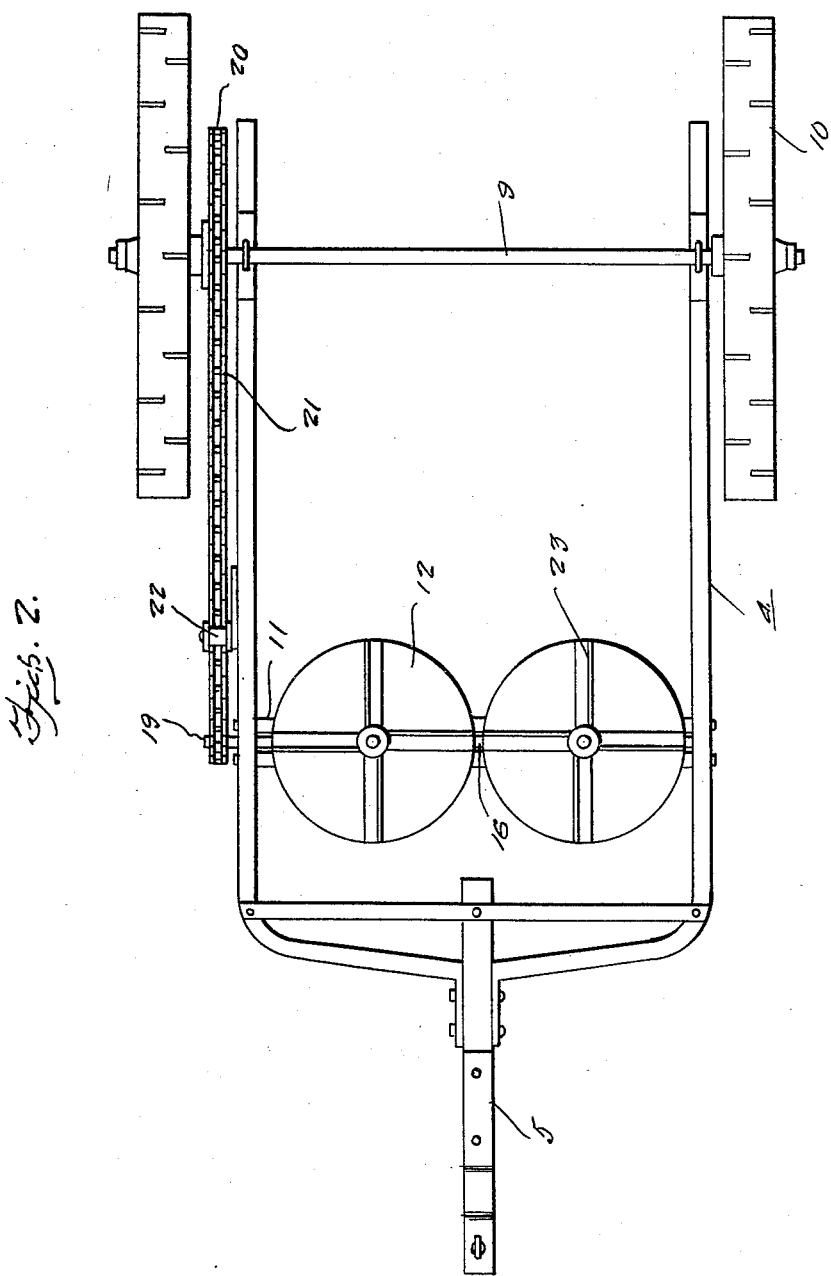

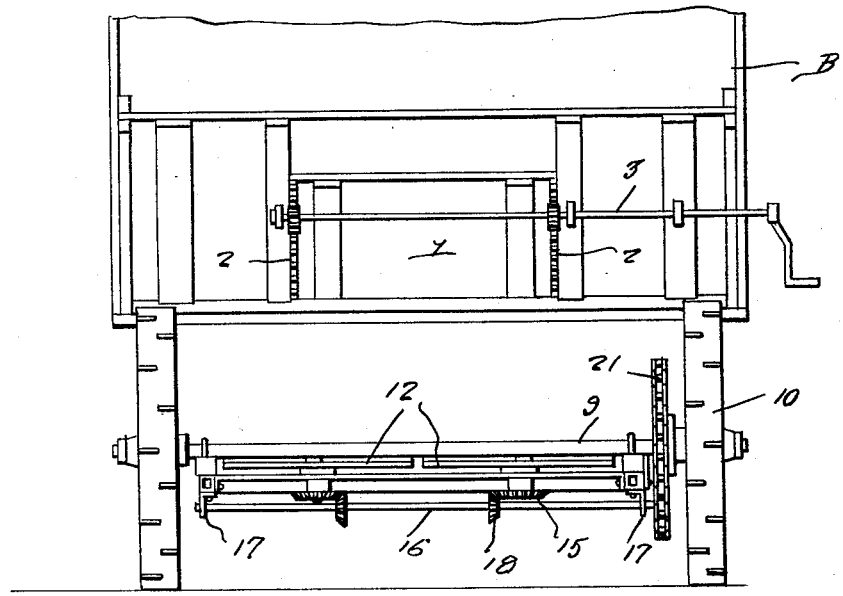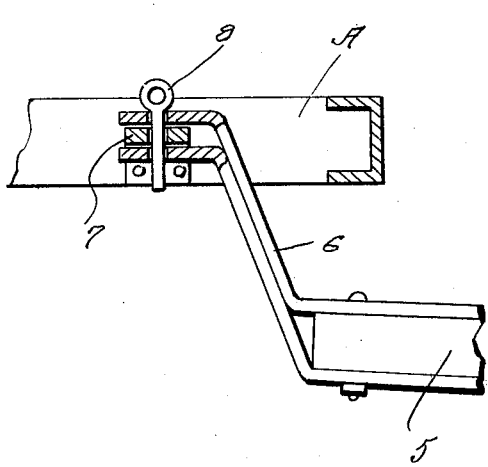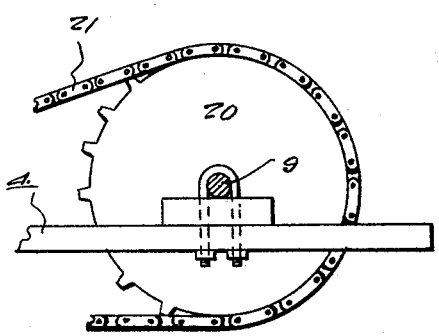

Inventor
F. J. Yochem

By Clarence A. O'Brien
Attorney

Patented Dec. 8, 1931

1,835,196

UNITED STATES PATENT OFFICE

FRANK J. YOCHEM, OF FOWLER, INDIANA

SPREADER OR DISTRIBUTOR

Application filed February 11, 1931. Serial No. 515,033.

This invention relates to a spreader or distributor which is mainly designed for spreading limestone, lime and marl but which of course can be used for other purposes, the general object of the invention being to provide a spreader device adapted to be connected to the rear part of a truck which is provided with a dump body and an adjustable tail gate so that the material can be fed from the body when the same is in dumped position in regulated amounts, upon the spreader device which will spread the material on the ground as the truck is travelling along.

Another object of the invention is to provide the device with a pair of wheels and a number of revolving disks having ribs thereon, and means for rotating the disks from one of the wheels so that the material fallen from the truck body onto the disks will be thrown therefrom and thus be scattered on the ground.

This invention also consists in certain other features of construction and in the combination and arrangement of the several parts, to be hereinafter full described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation showing the rear part of the truck with the body in dumping position and showing the spreader device attached to the rear part of the chassis of the truck.

Figure 2 is a plan view of the spreader device.

Figure 3 is a rear view of Figure 1.

Figure 6 is a detail view showing how the sprocket wheel is arranged on the axle of the device and how the axle is supported from the frame of the device.

Figure 7 is a detail sectional view showing how the tongue of the device is connected to a part of the chassis of the truck.

Figure 4:
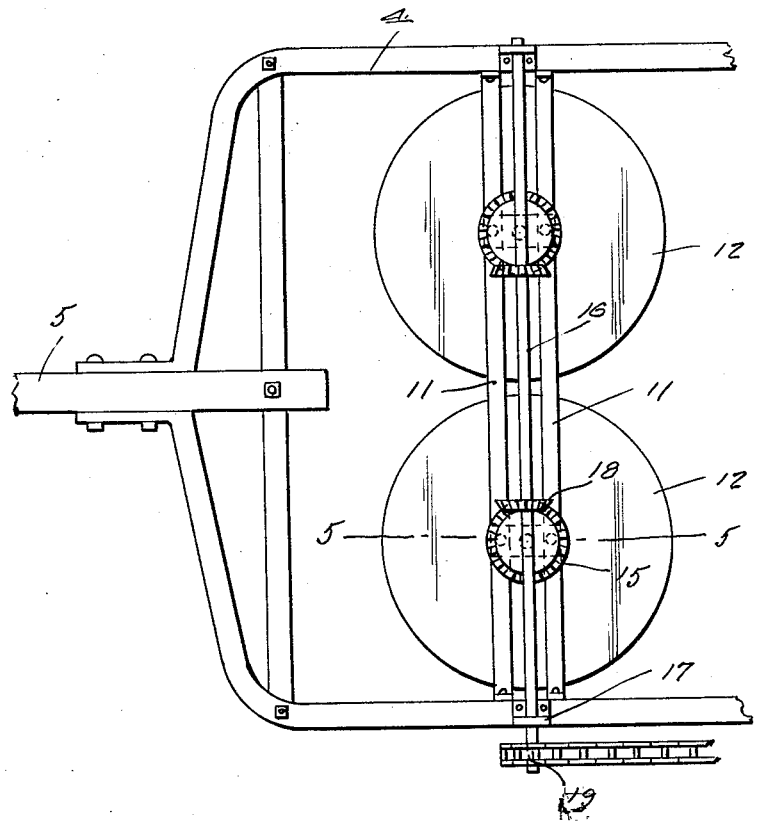
Figure 4 is a bottom plan view of part of the spreader device.
Figure 5:
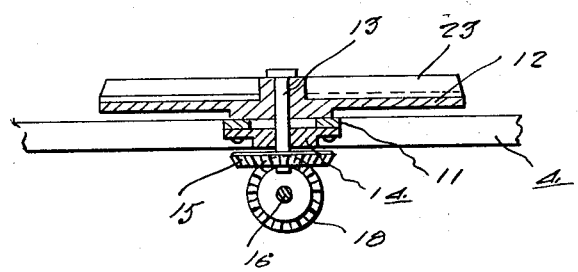
Figure 5 is a section on line 5—5 of Figure 4.

In these drawings the letter A indicates the truck which is provided with a dump body B, and said body has a tail gate 1 at its rear end which is raised and lowered by the rack means shown generally at 2 which includes the manually operated shaft 3 so that the gate may be opened to any desired expanse to regulate the amount of material passing through the rear opening of the body.

The spreader device comprises a substantially U-shaped frame 4 having a tongue 5 connected to the bight part, said tongue having a pair of substantially V-shaped straps 6 connected with the tongue end, the upper ends of these straps being spaced apart to receive a bracket 7 on the rear part of the chassis of the truck and these parts are perforated to receive a pin 8 which pivotally connects the tongue with the chassis. An axle 9 is connected with the rear portions of the limbs of the frame and a wheel 10 is mounted at each end of the axle. These wheels engage the ground as will be understood. A pair of bars 11 extend across the front part of the frame and a pair of horizontally arranged disks 12 are rotatably supported by these bars. A stub shaft 13 passes through the center of each disk and through a plate 14 fastened to the under part of the bars 11 and the beveled gear 15 is connected with the lower end of the shaft. A cross shaft 16 is journalled in the hangers 17 attached to the limbs of the frame and this shaft carries the beveled gears 18 which mesh with the gears 15. A sprocket 19 is fastened to one end of the shaft 16 and a sprocket 20 is connected with one of the hubs of one of the wheels 10 and a chain 21 passes over these sprockets. An idler 22 is supported from the frame and engages the chain to keep the same in proper engagement with the sprocket.

Thus it will be seen that the disks 12 are rotated from one of the ground wheels 10 as the device is pulled along by the truck and each of these disks has the upstanding radial ribs 23 on its upper face which are preferably constructed and arranged as shown. Thus as the material falls from the body of the truck it will drop upon these disks and will be thrown by said disks on to the ground so that the material will be properly spread upon the ground. The amount per acre spread is controlled by the speed of the truck and the rate of speed through the gate controlled opening at the rear end of the truck.

Thus it will be seen that I have provided simple means whereby material such as limestone, lime, marl and the like can be spread on the ground in any desired amount per acre, according to the speed of travel of the truck and to extent of opening of the end gate. With this invention the material can be loaded at the crusher or other point of supply and then run to the field which is to be treated. The spreader device is attached so that when the body is tilted and the gate opened, to the proper amount the material falling from the body upon the disks will be distributed upon the ground as the truck travels over the field.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:

In combination with a truck having a dump body, a trailer comprising a pair of side bars having inwardly extending curved ends, a tongue fastened to said ends, and connected with a rear part of the truck, a shaft journalled in the rear ends of the side members and having wheels on its ends, a pair of cross bars slightly spaced apart located adjacent the front end of the side members and having their ends attached thereto, a pair of bearing members carried by the cross bars, a vertically arranged stub shaft journalled in each bearing member and passing upwardly between the bars, a spreader disc connected with the upper part of each stub shaft, gears connected to the lower ends of the stub shafts, a cross shaft rotatably supported by the side members and located below the pair of bars, gears on said cross shaft meshing with the gears of the stub shaft, means for driving the cross shaft by one of the wheels of the rear shaft, radially extending cleats on the upper surfaces of the spreader discs, the tongue being of a length to place the spreader discs under the rear end of the said body when said tongue is connected to a rear part of the truck.

In testimony whereof I affix my signature.

FRANK J. YOCHEM.